(12) United States Patent
Pfaff

(10) Patent No.: US 10,685,077 B2
(45) Date of Patent: Jun. 16, 2020

(54) METHOD AND APPARATUS FOR INITIATING A TASK BASED ON CONTEXTUAL INFORMATION

(71) Applicant: HERE GLOBAL B.V., Eindhoven (NL)

(72) Inventor: Matthias Pfaff, Berlin (DE)

(73) Assignee: HERE Global B.V., Veldhoven (NL)

( * ) Notice: Subject to any disclaimer, the term of this patent is extended or adjusted under 35 U.S.C. 154(b) by 419 days.

(21) Appl. No.: 15/581,992

(22) Filed: Apr. 28, 2017

(65) Prior Publication Data

US 2017/0235744 A1 Aug. 17, 2017

Related U.S. Application Data

(63) Continuation of application No. 13/329,744, filed on Dec. 19, 2011, now abandoned.

(51) Int. Cl.
*G06F 16/9537* (2019.01)
*G06F 16/248* (2019.01)
(Continued)

(52) U.S. Cl.
CPC ........ *G06F 16/9537* (2019.01); *G06F 3/0482* (2013.01); *G06F 16/248* (2019.01);
(Continued)

(58) Field of Classification Search
CPC ............. G06F 16/9537; G06F 16/2428; G06F 16/9535; G06F 16/248; G06F 3/0482; G06F 17/248
(Continued)

(56) References Cited

U.S. PATENT DOCUMENTS 8,121,997 B2 * 2/2012 Raciborski .......... G06F 16/9032
707/706
8,584,219 B1 * 11/2013 Toole ...................... G06F 21/60
726/25

(Continued)

FOREIGN PATENT DOCUMENTS

WO 2011149992 A2 12/2011

OTHER PUBLICATIONS

Notification of Transmittal of the International Search Report and the Written Opinion of the International Searching Authority, or The Declaration; International Search Report and Written Opinion of the International Searching Authority for corresponding International Application No. PCT/FI2012/051230, dated Apr. 16, 2013, 14 pages.

(Continued)

*Primary Examiner* — Kristie D Shingles
(74) *Attorney, Agent, or Firm* — Ditthavong & Steiner, P.C.

(57) ABSTRACT

An approach for initiating a computing task based on generation of a statement or question formed using context information related to a user is described herein. A request generation platform determines an input from a device specifying at least one term. Context information associated with the device, a user of the device, one or more other devices, one or more other users, or a combination thereof is then determined. The request generation platform further causes, at least in part, a generation of at least one question, at least one statement, or a combination thereof based, at least in part, on the at least one term and the context information.

20 Claims, 13 Drawing Sheets

(51) Int. Cl.
  *G06F 16/242* (2019.01)
  *G06F 16/9535* (2019.01)
  *G06F 40/186* (2020.01)
  *G06F 3/0482* (2013.01)

(52) U.S. Cl.
  CPC ...... *G06F 16/2428* (2019.01); *G06F 16/9535* (2019.01); *G06F 40/186* (2020.01)

(58) Field of Classification Search
  USPC .......................................................... 709/203
  See application file for complete search history.

(56) References Cited

U.S. PATENT DOCUMENTS

| | | | | |
|---|---|---|---|---|
| 8,688,673 | B2* | 4/2014 | Sarkar | G06Q 30/02 707/706 |
| 9,025,767 | B2* | 5/2015 | Sovio | H04L 9/083 380/30 |
| 2007/0038436 | A1 | 2/2007 | Cristo et al. | |
| 2007/0112729 | A1 | 5/2007 | Wiseman et al. | |
| 2007/0276820 | A1 | 11/2007 | Iqbal | |
| 2009/0000634 | A1 | 1/2009 | Graefe et al. | |
| 2009/0006345 | A1 | 1/2009 | Platt et al. | |
| 2009/0234811 | A1 | 9/2009 | Jamil et al. | |
| 2010/0171756 | A1 | 7/2010 | Tosun et al. | |
| 2010/0205179 | A1* | 8/2010 | Carson | G06Q 10/10 707/740 |
| 2011/0173572 | A1 | 7/2011 | Van Zwol et al. | |
| 2012/0078938 | A1* | 3/2012 | Davis | G06F 16/3322 707/767 |
| 2012/0095988 | A1 | 4/2012 | Lei | |
| 2012/0296635 | A1* | 11/2012 | Brockett | G06F 17/2229 704/9 |

OTHER PUBLICATIONS

Office Action for related Indian Patent Application No. 5300/CHE/2012, dated Dec. 26, 2018, 6 pages.

* cited by examiner

- START
- 301: DETERMINE AN INPUT FROM A DEVICE SPECIFYING AT LEAST ONE TERM
- 303: DETERMINE CONTEXT INFORMATION ASSOCIATED WITH THE DEVICE, ONE OR MORE OTHER DEVICES, ONE OR MORE OTHER USERS, OR A COMBINATION THEREOF
- 305: CAUSE GENERATION OF AT LEAST ONE QUESTION AND/OR AT LEAST ONE STATEMENT BASED ON THE AT LEAST ONE TERM AND THE CONTEXT INFORMATION
- END

FIG. 3B
306

- START
- 307: CAUSE TRANSMISSION OF THE AT LEAST ONE QUESTION AND/OR THE AT LEAST ONE STATEMENT TO AT LEAST ONE OR MORE SOCIAL NETWORKS
- 309: CAUSE INITIATION OF (A) A QUERY, (B) AN APPLICATION, AND/OR (C) A SERVICE BASED ON THE AT LEAST ONE QUESTION AND/OR THE AT LEAST ONE STATEMENT
- 311: CAUSE A RENDERING OF ONE OR MORE ELEMENTS OF THE AT LEAST ONE QUESTION AND/OR THE AT LEAST ONE STATEMENT IN A USER INTERFACE
- 313: RECEIVING ANOTHER INPUT FOR SELECTING AT LEAST ONE OF THE ONE OR MORE ELEMENTS
- 315: CAUSE MODIFICATION OF THE AT LEAST ONE TERM AND/OR THE ONE OR MORE OTHER TERMS ASSOCIATED WITH THE SELECTED AT LEAST ONE OF THE ONE OR MORE ELEMENTS
- END

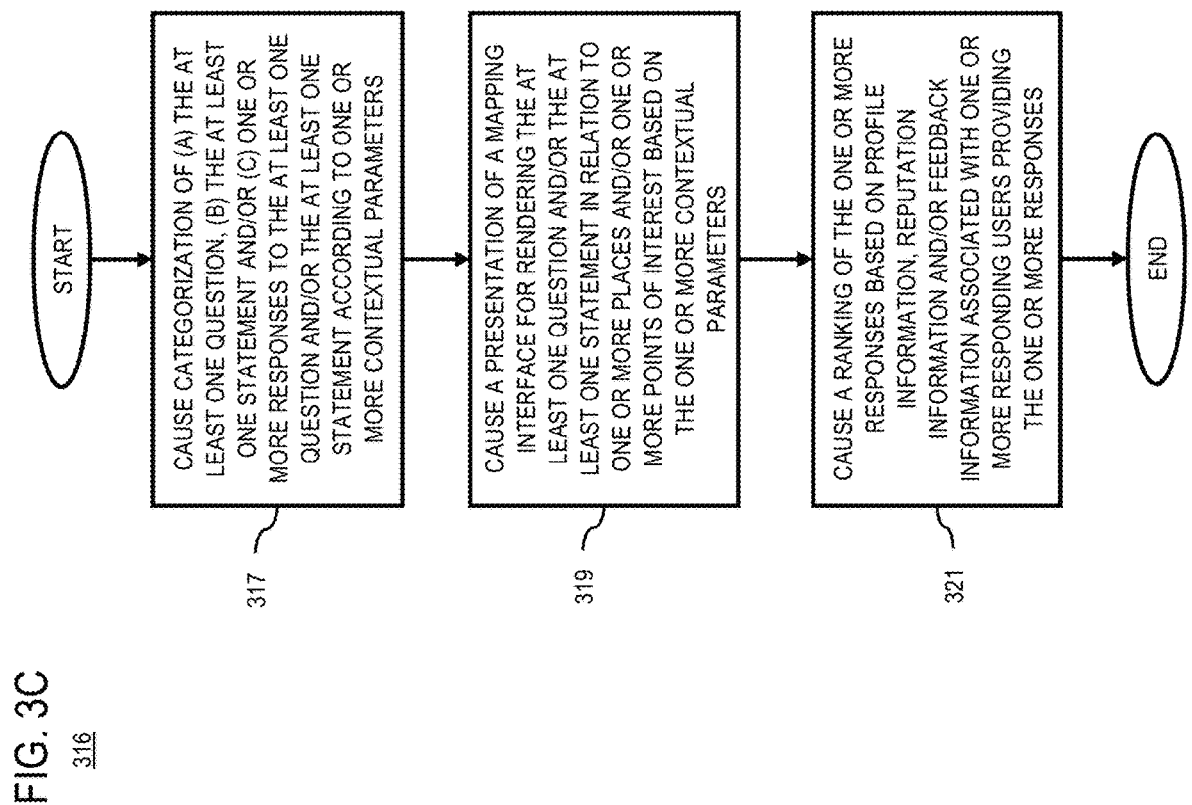

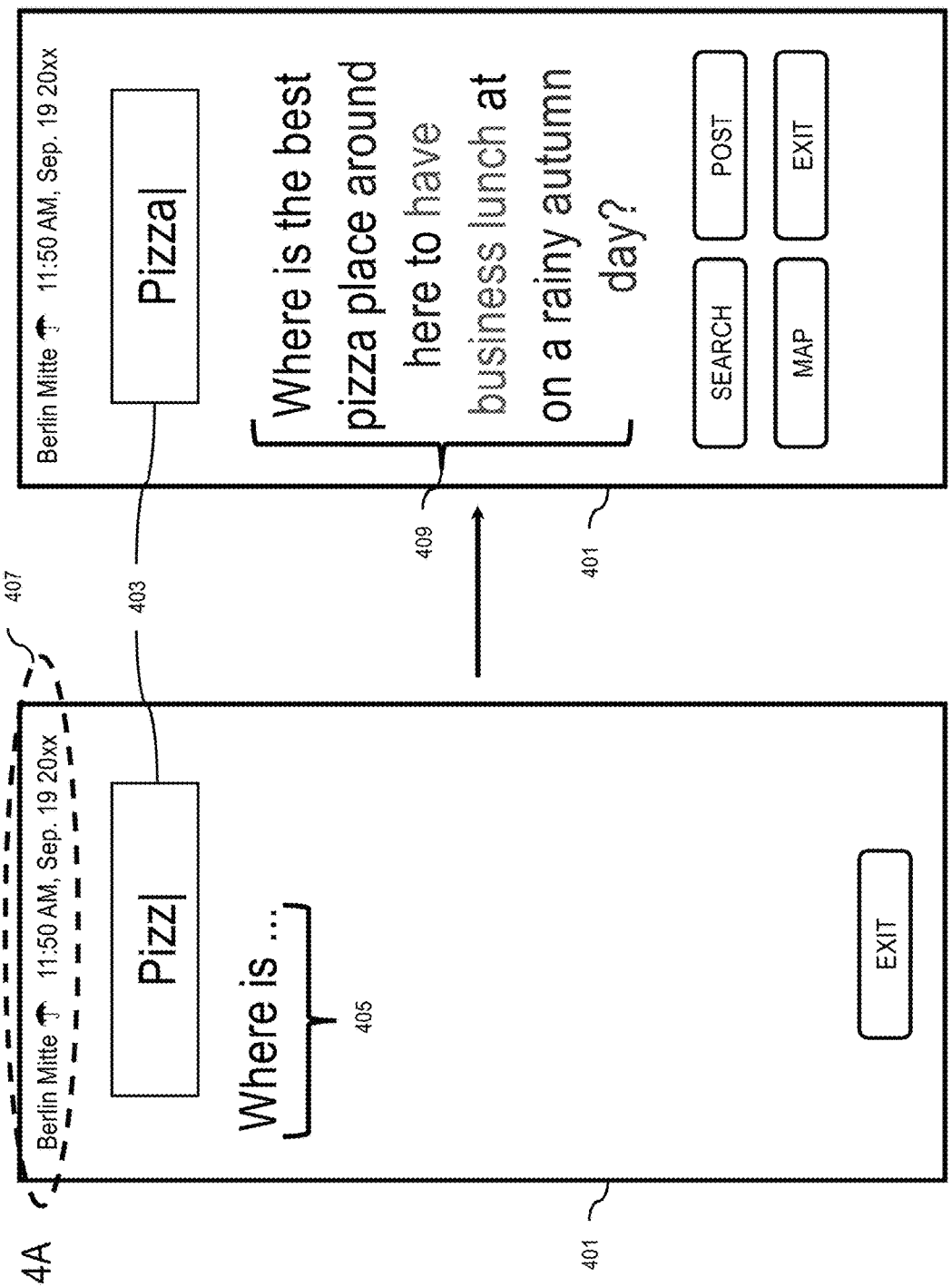

METHOD AND APPARATUS FOR INITIATING A TASK BASED ON CONTEXTUAL INFORMATION

RELATED APPLICATION

This application is a Continuation of U.S. patent application Ser. No. 13/329,744 filed on Dec. 19, 2011 entitled "Method and Apparatus for Initiating a Task Based on Contextual Information," which is incorporated herein by reference in its entirety.

BACKGROUND

Service providers and device manufacturers (e.g., wireless, cellular, etc.) are continually challenged to deliver value and convenience to consumers by, for example, providing compelling network services. One area of interest is providing a more effective means of initiating computing or device tasks based on the specific needs of a user. Tasks may include, for example, performing a query, posting information to a social network, submitting an application request, or the like. In the case of a query, search indexes are useful for retrieving information regarding a subject of interest. However, the means of providing input for executing the search is based solely on manual data entry. The user must enter one or more keywords, phrases and other information to render a truly useful search result. Similarly, when the user wants to generate a statement or question regarding a specific subject for posting at a social networking service, they are required to formulate the message themselves. Hence, there is currently no convenient way for enabling a user to automatically generate questions or statements surrounding in relation to a task based on the unique context of the user.

SOME EXAMPLE EMBODIMENTS

Therefore, there is a need for an approach for initiating a computing task based on generation of a statement or question formed using context information related to a user.

According to one embodiment, a method comprises determining an input from a device specifying at least one term. The method also comprises determining context information associated with the device, a user of the device, one or more other devices, one or more other users, or a combination thereof. The method further comprises causing, at least in part, a generation of at least one question, at least one statement, or a combination thereof based, at least in part, on the at least one term and the context information.

According to another embodiment, an apparatus comprises at least one processor, and at least one memory including computer program code for one or more computer programs, the at least one memory and the computer program code configured to, with the at least one processor, cause, at least in part, the apparatus to determine an input from a device specifying at least one term. The apparatus is also caused to determine context information associated with the device, a user of the device, one or more other devices, one or more other users, or a combination thereof. The apparatus is further caused to generate at least one question, at least one statement, or a combination thereof based, at least in part, on the at least one term and the context information.

According to another embodiment, a computer-readable storage medium carries one or more sequences of one or more instructions which, when executed by one or more processors, cause, at least in part, an apparatus to determine an input from a device specifying at least one term. The apparatus is also caused to determine context information associated with the device, a user of the device, one or more other devices, one or more other users, or a combination thereof. The apparatus is further caused to generate at least one question, at least one statement, or a combination thereof based, at least in part, on the at least one term and the context information.

According to another embodiment, an apparatus comprises means for determining an input from a device specifying at least one term. The apparatus also comprises means for determining context information associated with the device, a user of the device, one or more other devices, one or more other users, or a combination thereof. The apparatus further comprises means for causing, at least in part, a generation of at least one question, at least one statement, or a combination thereof based, at least in part, on the at least one term and the context information.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3A-3C are flowcharts of processes for initiating a computing task based on generation of a statement or question formed using context information related to a user, according to various embodiments;

FIGS. 4A-4F are diagrams of user interfaces utilized in the processes of FIGS. 3A-3C, according to various embodiments;

DESCRIPTION OF SOME EMBODIMENTS

Examples of a method, apparatus, and computer program for initiating a computing task based on generation of a statement or question formed using context information related to a user are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to computing tasks, it is contemplated the approach described herein may be used with any device, server, application or programming task and/or process execution.

Figure 1:
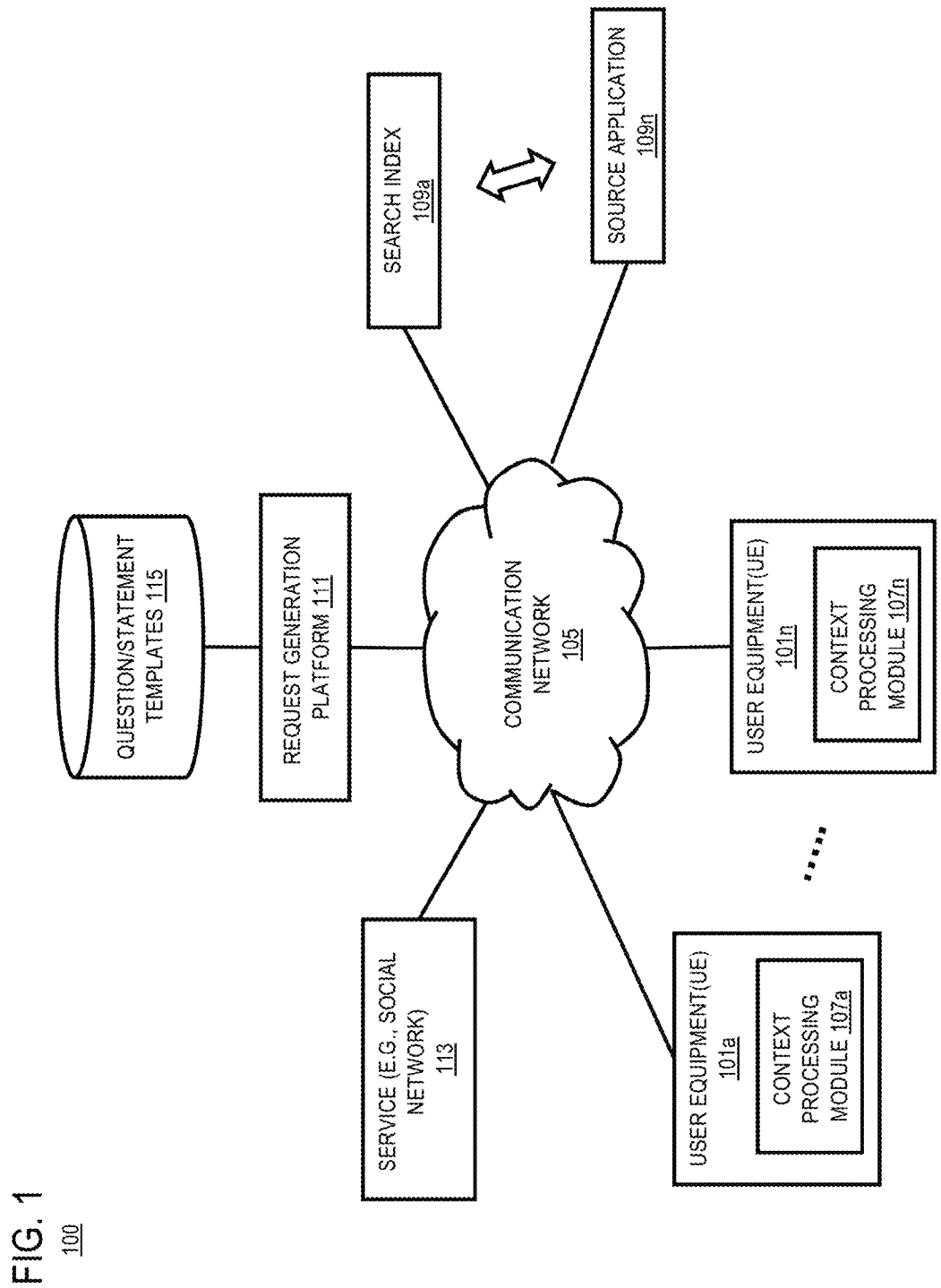
FIG. 1 is a diagram of a system capable of initiating a computing task based on generation of a statement or question formed using context information related to a user, according to one embodiment.

FIG. 1 is a diagram of a system capable of initiating a computing task based on generation of a statement or question formed using context information related to a user, according to one embodiment. By way of illustration, the system includes a request generation platform 111 that is configured to automatically generate statements or questions for initiating a task—i.e., a query, application or service. The statement or question is formulated based on context information related to the user or their environment, such as the user's current location, current weather conditions or temporal information. Once formulated, the statement or question is submitted to an application for execution and/or executed by the device of the user for which the statement or question is based.

Computing tasks requiring some means of user provided input includes the performing of a search (e.g., via an online search index), posting of a message to a social networking site, entry of a command to an application, etc. Typically, the user's ability to initiate their desired task or application request is based solely on the information provided by the user. For example, in the case of a device user employing a mapping application and/or search index to identify the location of the closest hotel to their present location while they are traveling on a business trip, the application and/or index are limited in their ability to render a result set befitting the specific needs of the user at that moment. This is because contextual details regarding the user such as the fact they are traveling away from home, are on a business trip, may be hungry, etc., are not factored into the result generation process. At best, the user must continually refine their query by manually providing additional details in the form of keywords, phrases, etc. Hence, the user may go from entry of the term "Hotels in Chicago, Ill." to "Hotels in Chicago, Ill. that are good for business travelers." In the latter scenario, the query is more elaborate and may render some additional results, but still may not reflect what the user requires at the moment. Furthermore, the input for generating the request (e.g., query) requires much user intervention. There is currently no convenient means of automatically generating requests, including statements or questions that are contextually relevant to the user for initiating a computing or application related task. Likewise, current user input means are not user-friendly and don't allow for easy adaptation of one or more parameters of the request for achieving a more accurate result.

To address this problem, a system 100 of FIG. 1 introduces the capability to use context information associated with the user to drive generation of a question or statement for initiating a task. The question or statement may include a plurality of terms, wherein one or more of the terms are based upon or directly inserted into the question or statement as a result of the gathered context information. Furthermore, the question or statement may be related to a specific input term, as entered by a user of a device 101, for initiating generation of the question or statement. By way of example, entry of the term "food" may be processed by the request generation platform 111 with respect to context information such as current time and location information. This term may then be translated into the question, based on the context, of "Where can I find good food for dinner around River Park." In this example, the request generation platform 111 relies upon temporal information to determine the context of "dinner" while location information is used to determine the locale context of "River Park," a local children's park. One or more user preferences may also be specified, such as by way of one or more profile settings established by the user for directing the question or statement generation process of the platform 111 relative to specific user interests, In certain embodiments, the request generation platform 111 presents an input selection user interface for enabling user entry of a term for which to base a request on. The input selection user interface (referred to herein also as user interface) also enables presentment of the rendered question or statement as generated pursuant to the entry. In addition, the request generation platform 111 also enables a user to readily modify several elements (e.g., terms) of the question or statement; and resultantly, refine the task to be executed. For example, in the case of the above statement regarding good food, the user can modify the term "good" to "Soul" so that the question reads "Where can I find Soul food for dinner around River Park." The modification can be made directly from the user interface by way of a keyboard update. Alternatively, the user may be presented with one or more alternative selections to choose from, such as by way of a selection menu or the like. As such, the user is able to quickly and seamlessly adapt a question or statement to suit their purpose.

In certain embodiments, the input selection user interface may also be integrated for use in connection with various other applications and device tools. The integration may include the development and use of application programming interfaces (APIs) and other integration approaches. For example, the request generation platform 111 may be configured to cause presentment of a mapping interface for rendering a question or statement in relation to one or more places or points of interest. As before, the returned result set would be based one or more contextual parameters, and in the case of the question regarding Soul food, one or more restaurants related to this genre are returned. In another example, the same question or statement can be submitted to a social networking service 113 for posting and viewing by one or more friends. Under this scenario, the friends of the user of a device from which the posting was executed, i.e., UE 101, a can respond to the question or statement. In addition, the user can rank or categorize the responses for enabling them to be used for subsequent task executions.

It is noted that external resources such as weather data, news feed data, traffic data, etc., may be accessed by the request generation platform 111 for determining user and/or device context. For example, in the case of a mapping application, current traffic conditions relative to the determined location of the user may be factored into the question or statement generation process. Under this scenario, a question "What is the most scenic route from here to my destination?" is presented, based on unfavorable traffic conditions, as "What is the best route from here to my destination during rush hour?"

As noted, the request generation platform 111 relies on context information gathered via a user device 101 to determine which question or statement to present to the user interface in response to entry of a term. For example, if a user is currently using a mapping application at 12:30 pm, this activity information and timing info is used to guide the input variable of "pizza" to a question of "where is the best place for pizza during lunch?" One or more question/ statement templates 115 are employed by the platform 111 for processing the context information and generating the question. In certain embodiments, the templates 115 may include one or more conditions, rules or guidelines for selection or generation of a question or statement based on the context. In the case of question selection, the templates 115 also enable the request generation platform 111 to select from a bank of predetermined or prior generated questions or statements. Under this scenario, historical contextual scenarios may be used by the platform in generating a statement. By way of example, entry of the term "workout" to the interface at 11:30 am at the location of the user's martial arts club can be readily translated into the statement "I am doing my martial arts workout." This statement is selected based on prior instances of the statement being generated during the same time of day for the same location.

It is noted in certain embodiments that the statement or question generated via the platform 111 can be subsequently issued to or passed onto an application 109n, search index 109a, or other application for initiation of a task. Also, with respect to the example above, the statement "I am doing my martial arts workout" can be caused to initiate a posting of the message to a social networking service 113 for enabling the user to convey their current activity with friends.

By providing a question or statement for the user in response to a provided input term, the amount of time and effort required of the user to initiate a viable message for execution of a query or post, or execution of an application or service is minimized. Instead, more readily discernible, contextually relevant messages are created for selection and use by the user. Automated creation or retrieval of statements or questions based on context information increases the likelihood of defining the unique needs of the user based on at least a single input term. It is noted that multiple terms may also be provided as input via the input selection interface. The input selection interface is discussed more fully later on with respect to FIGS. 4A-4F.

In certain embodiments the request generation platform 111 performs one or more of the following: (1) provides an input selection interface for enabling the inputting and/or modifying of terms or keywords expressed in a provided statement or question; (2) determines to receive an input term (e.g., keyword) upon which to base a question or statement; (3) processes context information regarding the user, the UE 101 upon which the request was made, or other devices related to or interacting with the UE 101 of the user; (4) formulates a question or statement related to the term based on, or inclusive of, the context information; (5) enables categorization of one or more responses to a statement or question; and (6) enables initiation of an application or device task based on the statement or question. It is also noted that the statement or question generated may also be formulated as a command, such as for initiating a processing task by an application 109n.

As shown in FIG. 1, the system 100 comprises a user equipment (UE) 101 having connectivity to the request generation platform via a communication network 105. In certain embodiments, context information is gathered by way of one or more sensors of the respective UE 101a-101n and subsequently shared with the request generation platform 111 by way of a context processing module 107a-107n respectively. The context processing modules 107a-107n convey context information to the platform 111 in the form of location information, motion information, device usage information, device status information, or a combination thereof. Sensors employed by the context processing module 107 for gathering such data may include a gyroscope, weather sensor, temporal sensor, global positioning sensor, motion detection sensor, or the like By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, the request generation platform 111, service 113, search index 109a and source application 109n communicate with each other and other components of the communication network 105 using well known, new or still developing protocols. Alternatively, the source application 109n may reside on a given UE 101 for direct execution. In this context of a network based communication, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
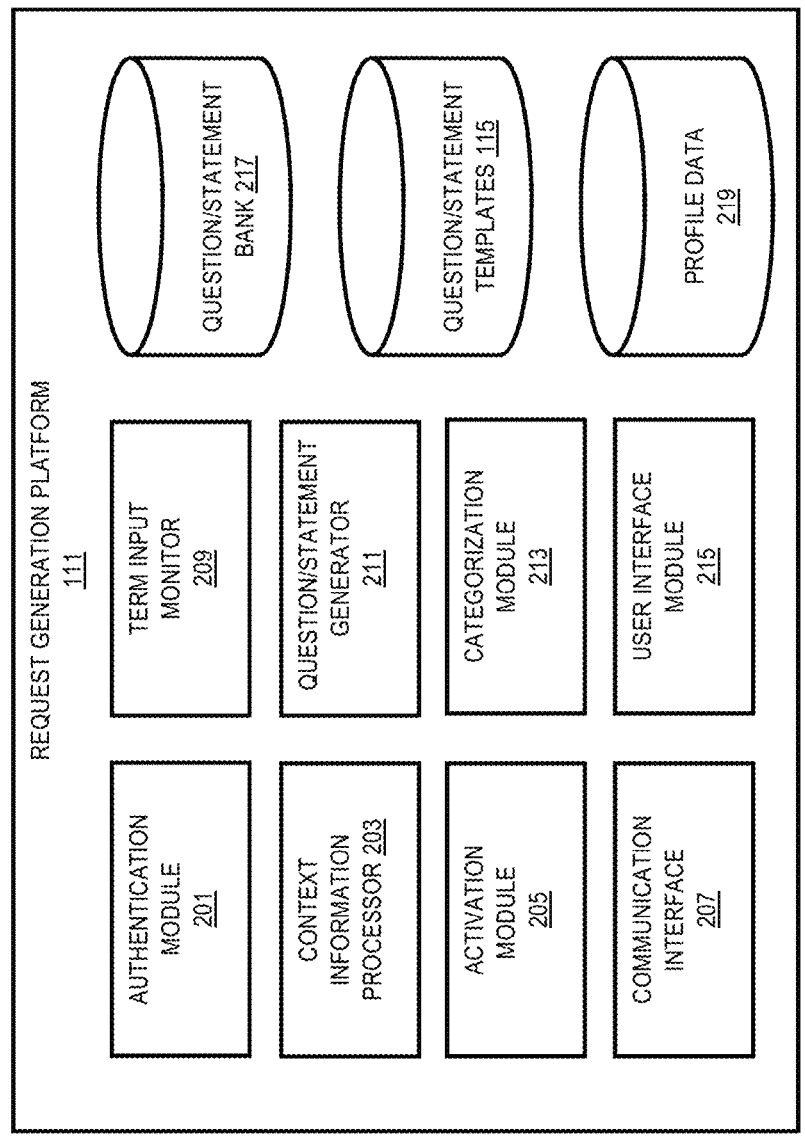
FIG. 2 is a diagram of the components of a request generation platform, according to one embodiment.

It is noted that the request generation platform 111 may be implemented for use over the communication network 105 as a hosted solution or subscription service. This may include, for example, the telecommunications service provider that supports execution of UE 101a-101n via the communication network 105. Alternatively, the request generation platform 111 can be directly integrated for execution by UE 101a-101n. FIG. 2 is a diagram of the request generation platform, according to one embodiment.

By way of example, the request generation platform 111 includes one or more components for initiating a computing task based on generation of a statement or question formed using context information related to a user. It is contemplated that the functions of these components may be combined in one or more components or performed by other components of equivalent functionality. In this embodiment, the request generation platform 111 includes an authentication module 201, context information processor 203, activation module 205, communication interface 207, term input monitor 209, question/statement generator 211, categorization module 213 and user interface module 215.

In addition, the modules 201-215 access various databases including a profile database 219 for maintaining profile information associated with one or more subscribed users, a question/statement template database 115 for maintaining one or more question/statement templates, and a question/statement bank 217 for maintaining one or more questions/statements. The aforementioned modules 201-215 access one or more of the databases 115, 217 and 219 for enabling execution of its various functions.

In one embodiment, an authentication module 201 authenticates users and user devices 101a-101n for interaction with the notification service 103. By way of example, the authentication module 201 receives a request to subscribe to the request generation platform 111. The subscription process may include the establishing of one of more question and/or statement preferences, one or more sensor type settings, preferred social networks, etc. Other preferences and settings may also be established based on the features of the device or the type of private resource(s) capable of being accessed by the device. Preferences and settings information may be referenced to a specific user, user device, wireless device, or combination thereof, and maintained as profile information 219. It is noted that the user may establish which devices to associate with its user profile in connection with the platform 111.

The authentication process performed by the module 201 may also include receiving and validating a login name and/or user identification value as provided or established for a particular user during a registration process with the service provider. The login name and/or user identification value may be received as input provided by the user from the user device 101 or other device via a graphical user interface to the platform 103 (e.g., as enabled by user interface module 215). Profile data 217 for respective subscribers, which contain pertinent user or device information, can be cross referenced as part of the login process. Alternatively, the login process may be performed through automated association of profile information 215 maintained as registration data with an IP address, a carrier detection signal of a user device 101, mobile directory number (MDN), subscriber identity module (SIM) (e.g., of a SIM card), radio frequency identifier (RFID) tag or other identifier.

In one embodiment, the term input monitor 209 processes a term provided by a user via the input selection interface as provided by the user interface module 215 and passes this term on to the question/statement generator 211. In addition, the term input monitor 209 determines the adapting of any additional words, terms or other elements of a question or statement as already rendered. For example, the term input monitor 209 detects changes to various elements of the question "Where's the best place for pizza in Chicago for lunch?" Under this scenario, the term input monitor 209 recommends various terms in place of the element "best" in the statement above. It is noted that, in certain instances, the term input monitor 209 performs a term lookup, spell check or initiates a basic search related to the term for informing the question/statement generator 211.

In one embodiment, the context information processor 203 analyzes the context information provided by context modules 107a-107n of the various devices of the user. This analysis is performed in concurrence with processing of the input by the term input monitor 209, such as to determine a relevant context of the user, the UE, or other UEs at the moment of input entry. The determined context of the user as well as the input term as provided are then provided to the question/statement generator 211.

In instances where a device associated with the user is not equipped with a context module 106, the context information processor 203 interprets data collected by one or more sensors of the device to generate context information. The data is processed according to the sensor type—i.e., if the sensor is a network detection sensor, it processes and interprets the network data (e.g., internet protocol address information). Once processed, the context information processor 203 further determines the current state, activity or actions of the user, UE 101, or other UEs (e.g., within proximity).

In one embodiment, the question/statement generator 211 receives a term provided as input from the term input monitor 209 as well as the context information as provided by the context information processor 203. In response, the generator 211 retrieves a corresponding question and/or statement to convey to the user for responding to the input term. The question and/or statement are retrieved from the question/statement bank 217, such as based on context information processed by the context information processor 203. Hence, the one or more question/statement templates 115 include various rules, criteria and conditions for guiding the construction of a statement or question. This may include, for example, the processing of historical data (e.g., prior generated statement or questions) as well as various conditional scenarios (e.g., IF term input=_____ AND condition A=_____ THEN execute condition B).

Still further, the question/statement generator 211 may be configured to monitor the response of a user to one or more rendered statements or questions, such as to train its responses. For example, when an input term and set of contextual conditions are determined to repeat over time, the question or statement provided in response is prioritized. Future occurrences of the same or similar input and contextual conditions are then readily associated with this particular question or statement. Under this scenario, the question/statement generator 211 may also access profile information 219 regarding a user for directing the question or statement generation process.

As another example, a response to a query or posted question may also be monitored to determine the effectiveness of the search results or the level of feedback of the posting. The response to a question may be ranked, such as by the user, then added to the question/statement bank 217 in association with the ranking. It is noted that the ranking may be a feedback level, a like/dislike rating, a number of stars, etc. In one embodiment, the categorization module 213 operates in connection with the question/statement generator 211 in order to maintains a categorization of the question or statement as well as causing, at least in part, a categorization of (a) the at least one question, (b) the at least one statement, (c) one or more responses to the at least one question, the at least one statement, or a combination thereof, or (d) a combination thereof according to one or more contextual parameters, In certain embodiments, the activation module 205 is configured to initiate a task based on the particular question or statement generated in response to the input term. For example, the task to be initiated may be a query, (b) an application, (c) a service, or (d) a combination thereof. By way of example, the query may be directed to a search index for retrieving information or resources related to the question or statement. As another example, the query may be directed to a mapping application for enabling retrieval of places, venues, maps and other information related to the question or statement. It is noted that the activation module 205 may operate in connection with one or more API functions of the requesting user device. As such, one or more function calls for posting, entering, executing, editing or other executions may be performed.

In one embodiment, a communication interface 207 enables formation of a session over a network 105 between the request generation platform 111 and the UE 101a-101n. By way of example, the communication interface 207 executes various protocols and data sharing techniques for enabling collaborative execution between a subscriber's user device 101a-101n (e.g., mobile devices, laptops, smartphones, tablet computers, desktop computers) and the request generation platform 103 over the network 105. It is noted that the communication interface 207 causes transmission of the at least one question, the at least one statement, or a combination thereof to at least one or more social networks. The social networks and corresponding access credentials are specified as profile information.

In another embodiment the user interface module 215 enables presentment of a graphical user interface for presenting the input selection interface, mapping interface, social networking interface, etc. By way of example, the user interface module 215 generates the interface in response to application programming interfaces (APIs) or other function calls corresponding to the browser application or web portal application of the user devices 101a-101n; thus enabling the display of graphics primitives. Hence, the input selection interface may be a browser based application or, in certain instances, implemented as an executable application operable by a given UE 101. The user interface module 215 causes a rendering of one or more elements of the at least one question or statement in a user interface of the device. Of note, the user interface module 215 may operate in connection with the term input monitor 209 for detecting adaptation of a particular element of a question or statement by the user.

Figure 6:
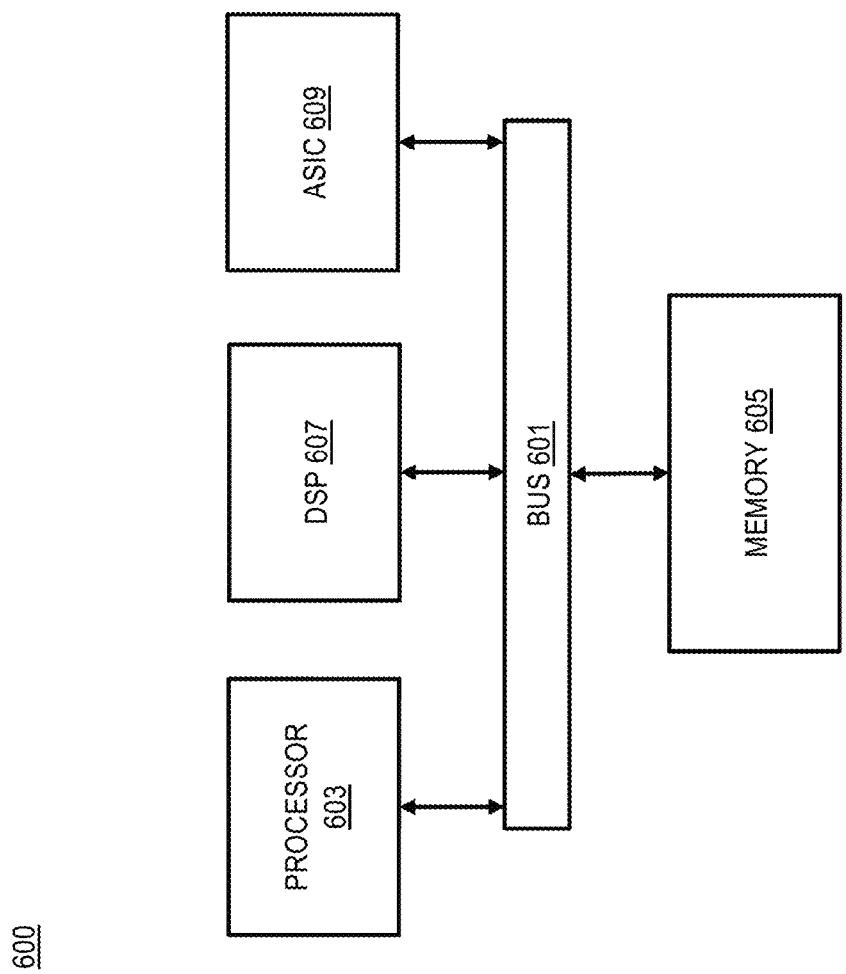
FIG. 6 is a diagram of a chip set that can be used to implement an embodiment of the invention.

FIG. 3 is a flowchart of a process for initiating a computing task based on generation of a statement or question formed using context information related to a user, according to one embodiment. In one embodiment, the request generation platform 111 performs the process 300 and is implemented in, for instance, a chip set including a processor and a memory as shown in FIG. 6.

In step 301, the platform 111 determines an input from a device specifying at least one term. As noted previously, the input includes at least in part one or more keywords, one or more images, one or more audio inputs, or a combination thereof. In another step 303, the platform 111 determines context information associated with the device, a user of the device, one or more other devices, one or more other users, or a combination thereof. Per step 305, the platform 111 causes generation of at least one question and/or at least one statement based on the at least one term and the context information. As noted, the context information enables the platform 111 to perceive various contextual details for guiding formation of a useful, humanistic question or statement. As such, the question or statement relating to the user is formed with minimal user intervention. Also, the platform 111 determines whether or not to form a question or statement intuitively based on the contextual factors and requirements of the user at the moment.

In step 307 of process 306 (FIG. 3B), the platform 111 causes transmission of the at least one question and/or the at least one statement to at least one or more social networks. In another step 309, the platform causes initiation of (a) a query, (b) an application and/or (c) a service based on the at least one question and/or the at least one statement. Hence, the question or statement generated by the platform may be passed, pushed, transferred, called, or otherwise executed in connection with a specific application task. In certain embodiments, the question or statement as generated may be further translated into an instruction for execution of various device or operating system tasks.

In step 311, the platform 111 causes a rendering of one or more elements of the at least one question and/or the at least one statement in a user interface. As noted, the one or more elements are associated with the at least one term, one or more other terms, or a combination thereof included in the at least one question, the at least one statement, or a combination thereof. Per step 313, the platform 111 receives another input for selecting at least one of the one or more elements, and further causes modification of the at least one term and/or the one or more other terms associated with the selected at least one of the one or more elements (step 315). As noted, the user interface may present one or more alternative terms for selection by the user for adapting the one or more elements. Under this approach, the user is able to adapt the question or statement with minimal effort.

In step 317 of process 316 (FIG. 3C), the platform 111 causes categorization of (a) the at least one question, (b) the at least one statement and/or (c) one or more responses to the at least one question and/or the at least one statement according to one or more contextual parameters. As noted above, the one or more contextual parameters include, at least in part, a location parameter, a temporal parameter, etc. In another step 319, the platform causes a presentation of a mapping interface for rendering the at least one question and/or the at least one statement in relation to one or more places and/or one or more points of interest based on the one or more contextual parameters. By way of example, the mapping interface may be integrated with the input selection interface for enabling dynamic generation of mapping information, search results, etc. Hence, the mapping interface may be caused to adapt in direct response to the adaptation of one or more elements of a question or statement rendered by the platform 111.

Step 321 corresponds to the social networking or shared communication exchange executions of the platform. In this step, the platform 111 causes a ranking of the one or more responses based on profile information, reputation information and/or feedback information associated with one or more responding users providing the one or more responses. Users can rank or categorize the responses for enabling them to be used for subsequent task executions. In the context of a search or inquiry, for example, the input selection interface may be offered as a service/API for social networks to provide answers and rankings of answers. The answers as ranked can also be considered a search result in addition to that provided by a search index.

FIGS. 4A-4F are diagrams of user interfaces utilized in the processes of FIGS. 3A-3C, according to various embodiments. For the purpose of illustration, the diagrams are presented with respect to a use case of a user querying friends via a social networking application and performing a search via a mapping application. In this scenario, the request generation platform 111 generates a question based on the context of the user. It is noted, however, that a statement may also be formed.

In FIG. 4A, the user enters a keyword into an input field 403 of the input selection interface 401. As the user types the word "Pizza" into the input field 403, the request generation platform 111 renders a dynamic (immediate) output 405 for indicating the search term is being translated into a user friendly question. Concurrent with entry of the term, the platform 111 also processes context information 407 related to the user or the device of the user. In this example, the context information includes location information corresponding to Mitte Berlin, weather information for indicating it is a rainy day, and temporal information for indicating the current time of day and corresponding date.

Based on the input term ("Pizza") and the determined context information, the platform 111 generates the question 409 of "Where is the best pizza place around here to have business lunch at on a rainy day?" The various elements of the question are formulated with keywords that are directly related to the user based on available context information. For example, the keyword/phrase "around here" is directly related to the known location information of Mitte Berlin in Germany. The keyword/phrase "business lunch" is directly related to the known temporal information, which suggests it is lunch time and the user is still at work. Still further, the keyword/phrase "rainy autumn day" is directly related to the known weather and date information. Of note, the resulting question 409 is produced with minimal input provided by the user.

Figure 4B:
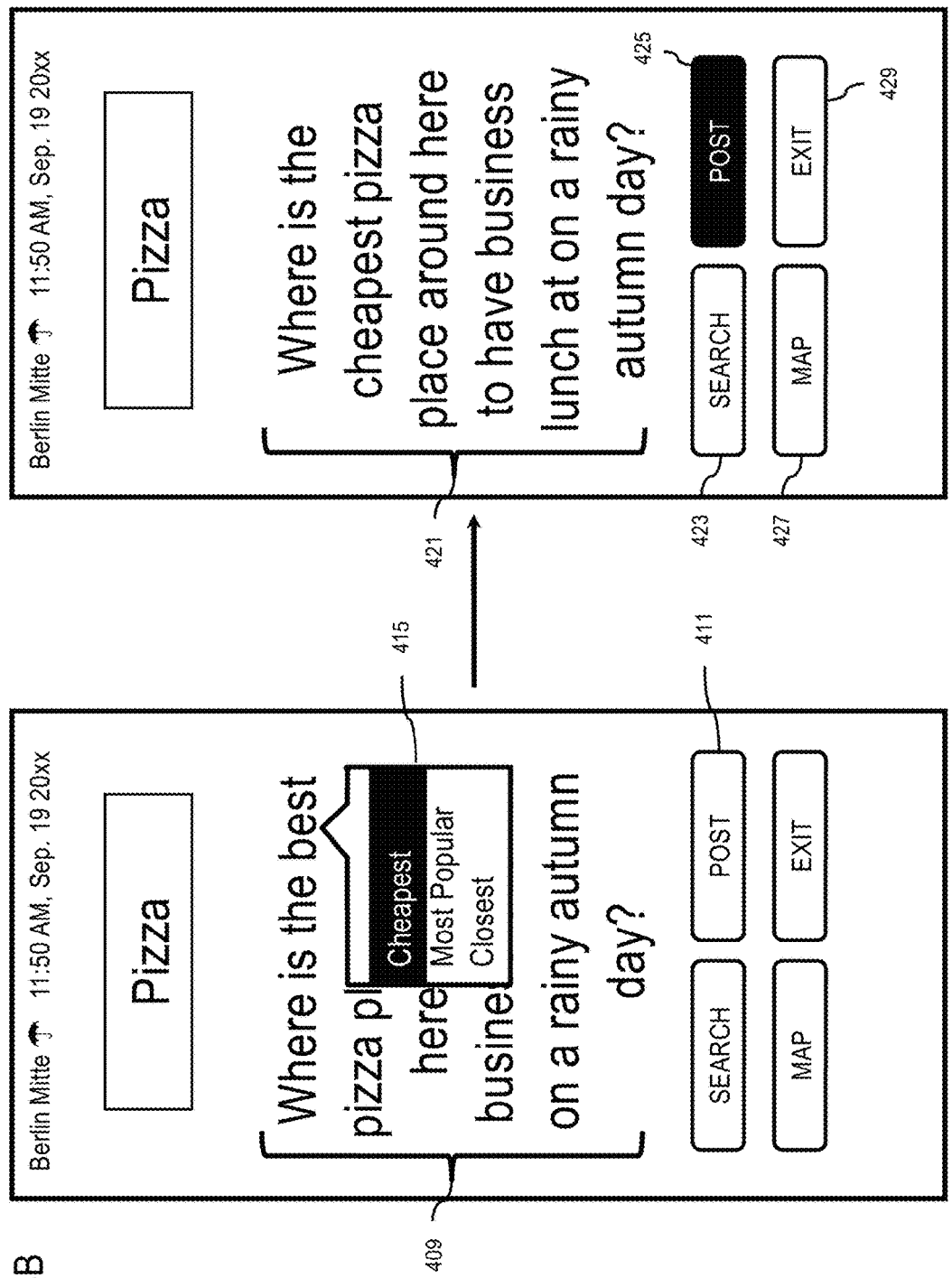

The user has the option of modifying any of the elements or terms comprising the question 409, as shown in FIG. 4B. Adaptation of the term may also cause adaptation of the task to be performed based on the question. In the current example, the user decides to change the term "best" to "cheapest" for producing a new question 421 of "Where is the cheapest pizza place around here to have business lunch at on a rainy day?" This is performed by the user through direct keyboard (or voice) entry via the interface 401. Alternatively, the user can click on or mouse over various terms of the question 407 for revealing one or more suggestions. For example, when the user clicks on or mouses over the term "best", a recommendation menu 415 is presented. The user can then select any of the terms to change the meaning of the question 409 and thus produce question 421.

Once the new question 421 is generated, the user may select from various action buttons to initiate a task. By way of example, when the user selects the POST action button 411, this causes the question 409 to be posted to a profile page of a user designated social networking service. The SEARCH and MAP action buttons 423 and 427 respectively cause the question 421 to be submitted to an application or index for performing a query or to a mapping application for generating mapping information (e.g., places, landmarks, addresses, etc. To discontinue use of the interface 401, the user selects the "EXIT" action button 429.

Figure 4C:
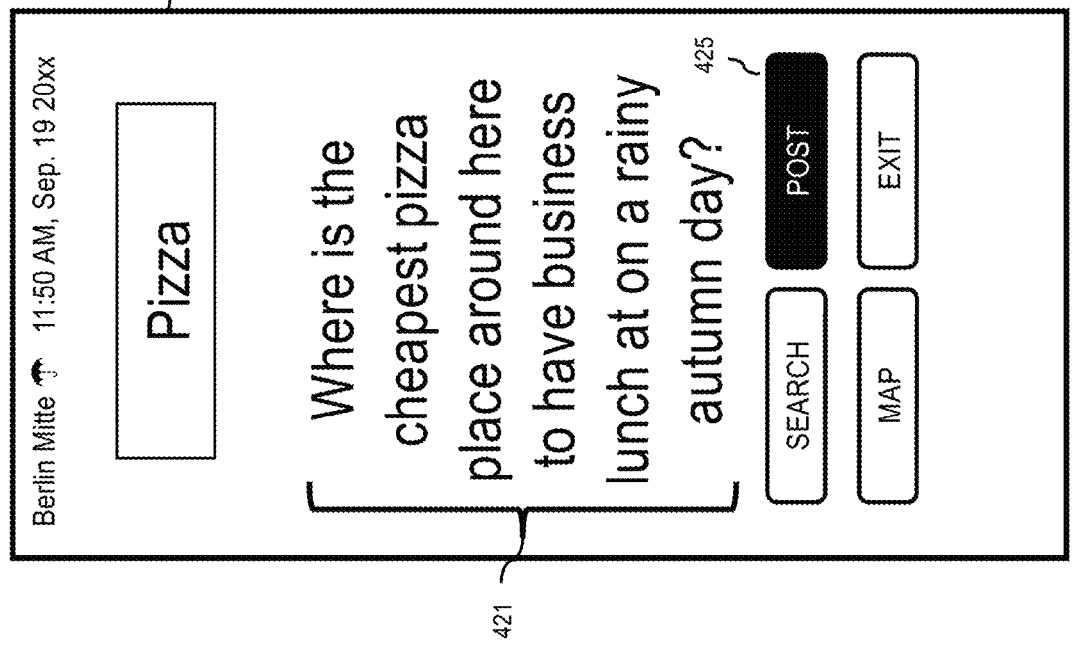

FIG. 4C depicts the process that occurs when the "POST" action button 425 is selected. The request generation platform 111 initiates submission of the post request, as indicated by the arrow 427 being directed towards a social networking interface 431. This causes the question 421 to be posted to the interface 431 for viewing and response by various other members of the same social networking service. Optionally, the context information upon which the question is based is also posted so that the potential responders understand the context of the question.

In this example, a friend of the user named Leo and the user's Mother respond to the question. Each of them submits responses 436 and 438, and both responses feature a link 435 and 437 respectively for providing location information suited to answering the question. The user can generate a response message or be alerted of any subsequent responses at a later time. In addition, the user can assign a ranking to the particular responder, the response they provided, or both. For example, after reviewing all the responses to the query 421, the user ranks the response by his Mom as a four-star response 439 while ranking the response by his friend as a two-star response.

Figure 4D:
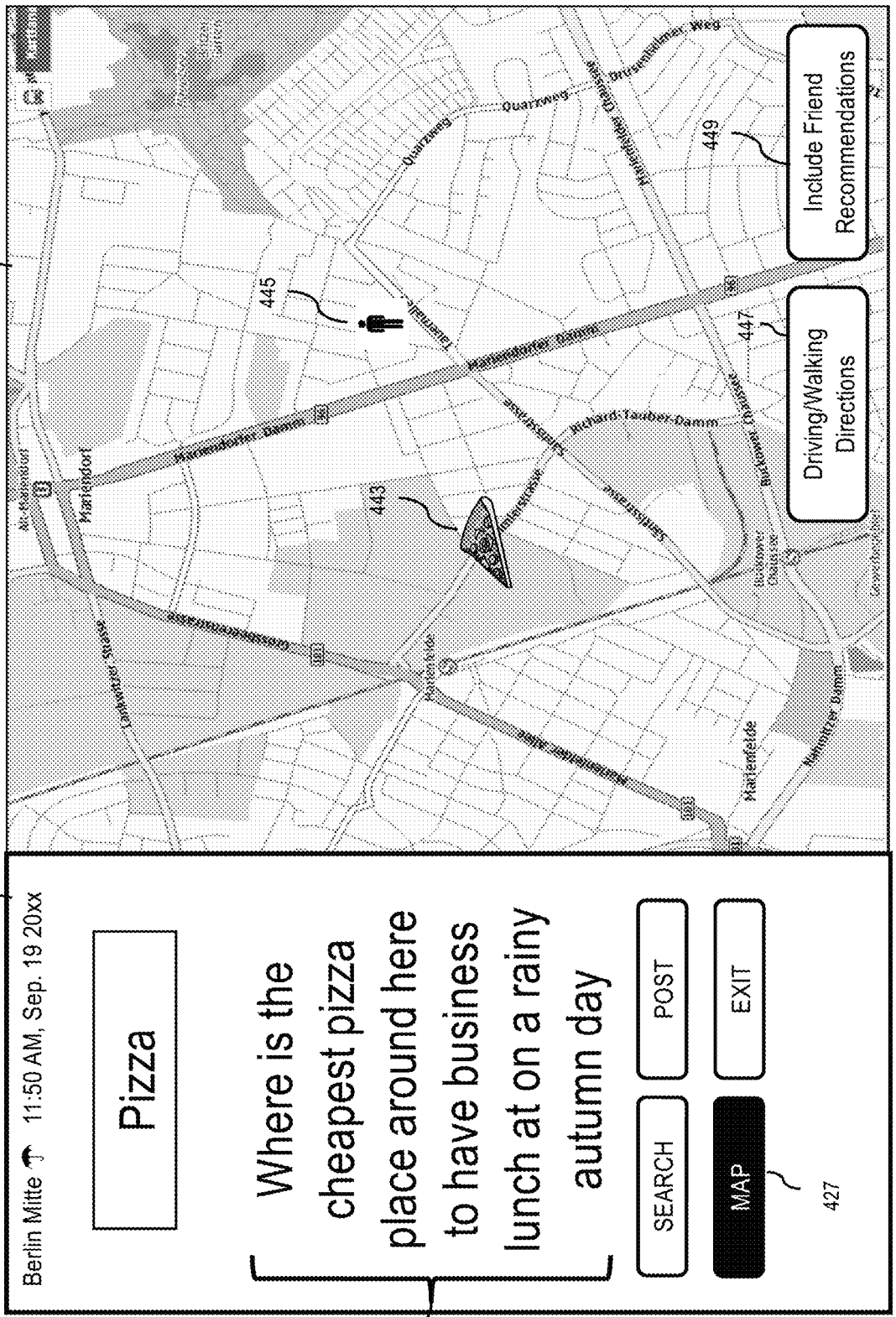
Figure 4E:
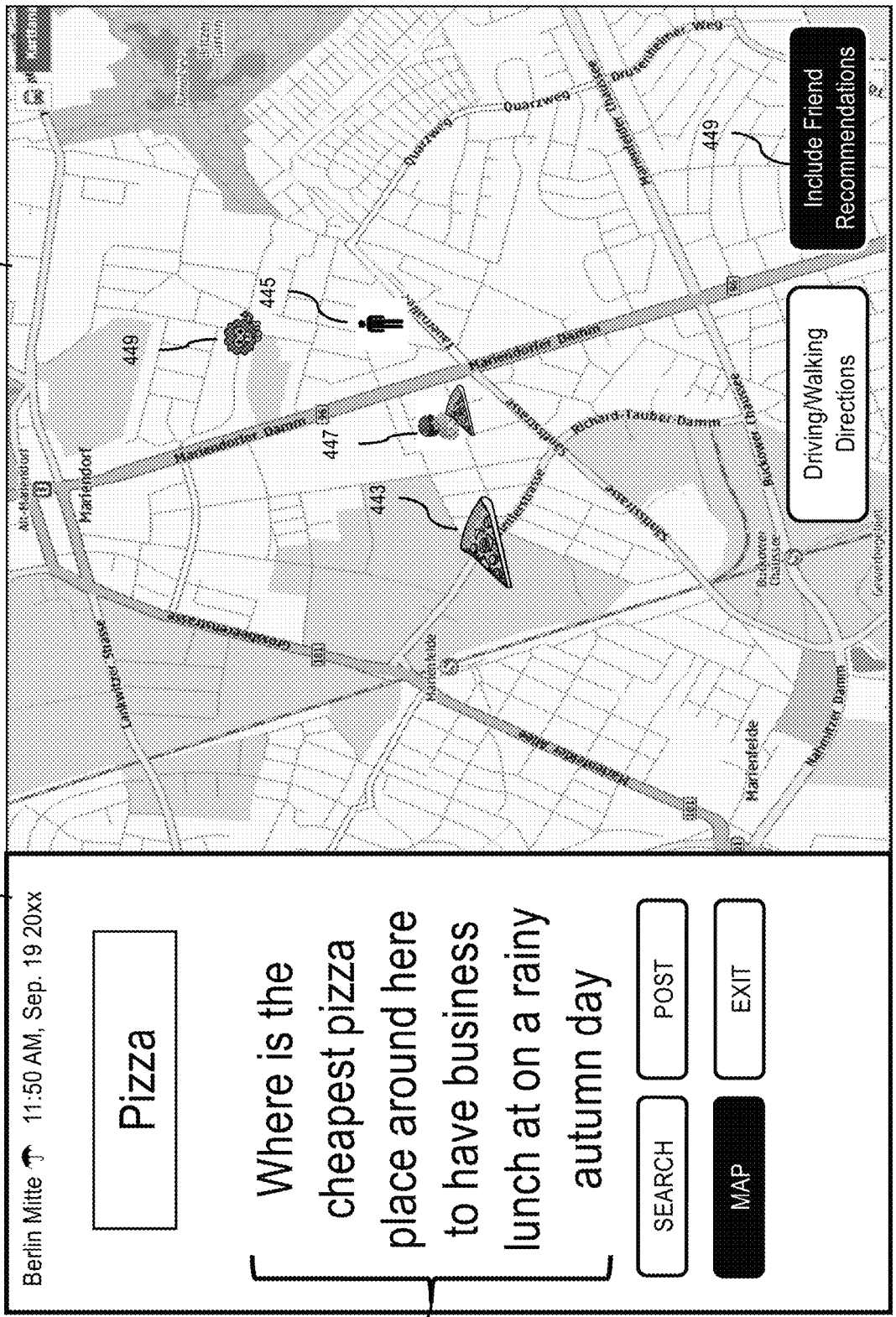
Figure 4F:
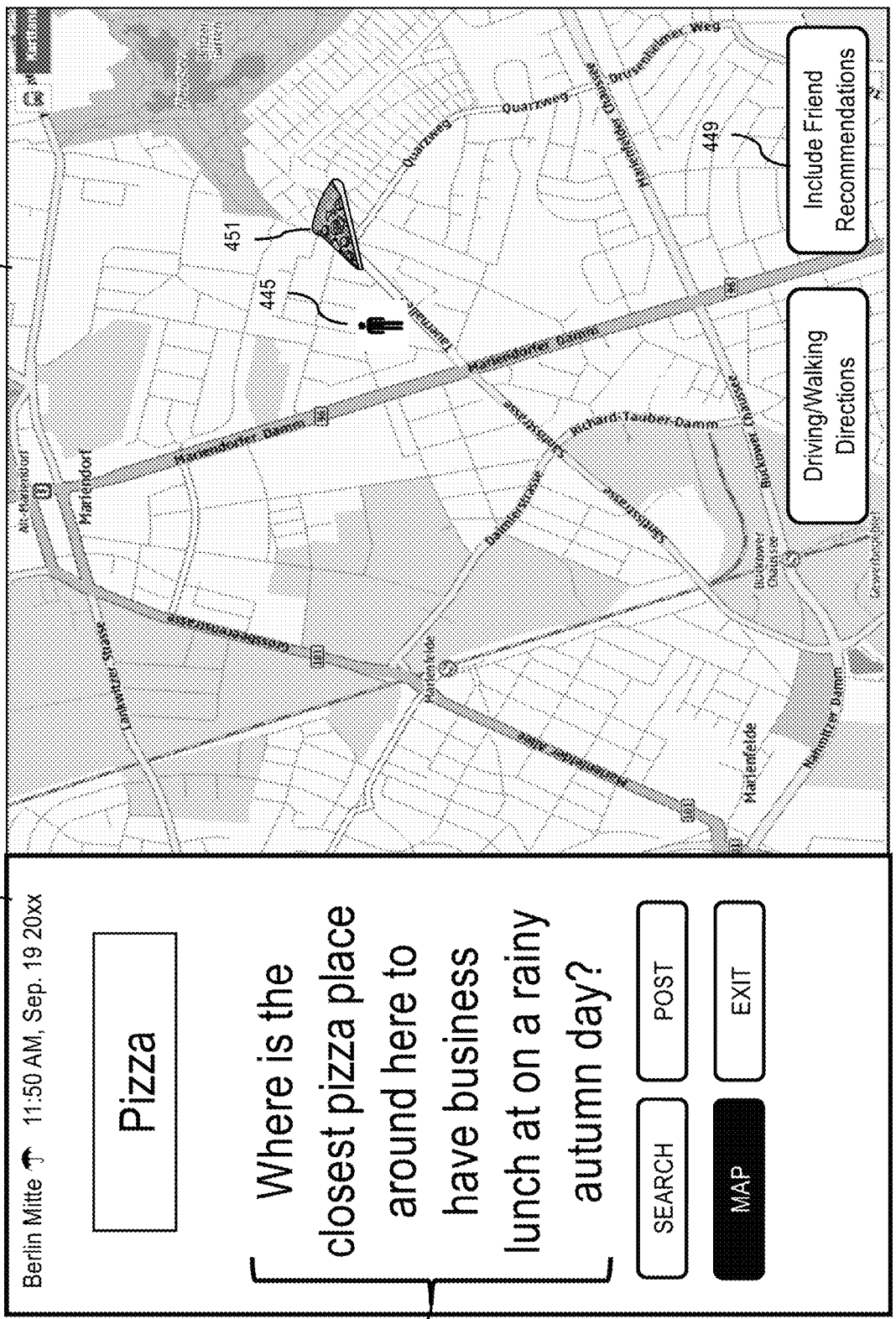

FIGS. 4D-4E depicts the interaction between the input selection interface 401 and a mapping application 441. The mapping application 441 is called for execution in response to user selection of the MAP action button 427. For the purpose of illustration, the input selection interface 401 is integrated within the mapping application 441, such that the interface 401 is presented as a left frame of content and the mapping application 441 is presented as a right frame of content. In this example, the mapping application 441 displays icon 445 for representing the location of the user and an icon 443 for representing the location of a restaurant. The restaurant location, as represented by the icon 443, is a response to the question 421 as presented to the mapping application 441 via the input selection interface 401 of the platform 111.

The user may also select an action button 447 for generating driving/walking directions from their present location to the restaurant. In addition, the user can select an action button 449 for enabling the recommendations provided by various friends to be posted to the mapping application interface 441. When the user selects this button 449, additional icons for representing the locations of places recommended by friends via the social networking service in reference to the question are shown in addition to the general search results. Hence, the platform 111 supports the juxtaposing of search result sets for enabling the fulfilling of tasks.

By way of example, in FIG. 4E, an icon representing the location of the places recommended by the different social networking friends are shown. Icon 447 corresponds to the location of Gino's Pizza, the restaurant suggested by the mother of the user and that was ranked highest. Icon 449 corresponds to the home location of the friend as suggested. The user can click on either of the icons to generate an expanded view of the map relative to the location anchor. Also, the user can mouse-over or click on an icon to generate a window for providing additional details regarding the recommended locations.

Still further, the user can make a modification to one or more of the terms of the question 421 to further refine the results. By way of example with respect to FIG. 4F, when the user changes the term "cheapest" to "closest," the resulting question 451 is "Where is the closest pizza place around here to have business lunch at on a rainy day?" In response, the request generation platform 111 immediately submits the query to the mapping application 441 to generate a new result. The icons 447 and 449 for representing responses to the other question 421 are removed from the map, while only the icon 451 for presenting a location of a restaurant that conforms to the question 461 as posed is presented.

The processes described herein for initiating a computing task based on generation of a statement or question formed using context information related to a user may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 5:
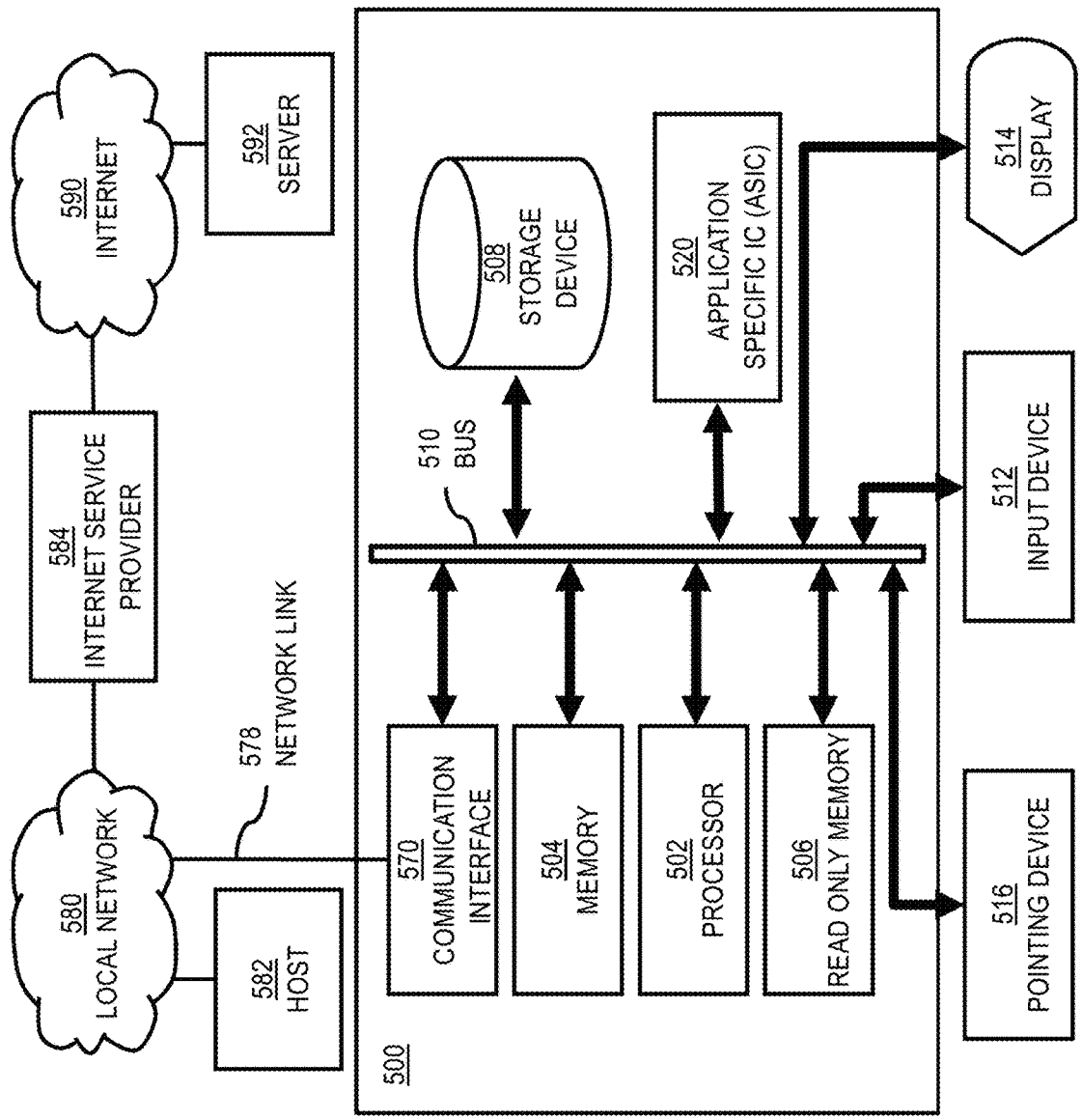
FIG. 5 is a diagram of hardware that can be used to implement an embodiment of the invention.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to initiating a computing task based on generation of a statement or question formed using context information related to a user as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of initiating a computing task based on generation of a statement or question formed using context information related to a user.

A bus 510 includes one or more parallel conductors of information so that information is transferred quickly among devices coupled to the bus 510. One or more processors 502 for processing information are coupled with the bus 510.

A processor (or multiple processors) 502 performs a set of operations on information as specified by computer program code related to initiating a computing task based on generation of a statement or question formed using context information related to a user. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or any other dynamic storage device, stores information including processor instructions for initiating a computing task based on generation of a statement or question formed using context information related to a user. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or any other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for initiating a computing task based on generation of a statement or question formed using context information related to a user, is provided to the bus 510 for use by the processor from an external input device 512, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT), a liquid crystal display (LCD), a light emitting diode (LED) display, an organic LED (OLED) display, a plasma screen, or a printer for presenting text or images, and a pointing device 516, such as a mouse, a trackball, cursor direction keys, or a motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of ASICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 for initiating a computing task based on generation of a statement or question formed using context information related to a user to the UE 101.

The term "computer-readable medium" as used herein refers to any medium that participates in providing information to processor 502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 508. Volatile media include, for example, dynamic memory 504. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or any other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

FIG. 6 illustrates a chip set or chip 600 upon which an embodiment of the invention may be implemented. Chip set 600 is programmed to initiating a computing task based on generation of a statement or question formed using context information related to a user as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing user interface navigation information associated with the availability of functions. Chip set or chip 600, or a portion thereof, constitutes a means for performing one or more steps of initiating a computing task based on generation of a statement or question formed using context information related to a user.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to initiating a computing task based on generation of a statement or question formed using context information related to a user. The memory 605 also stores the data associated with or generated by the execution of the inventive steps.

Figure 7:
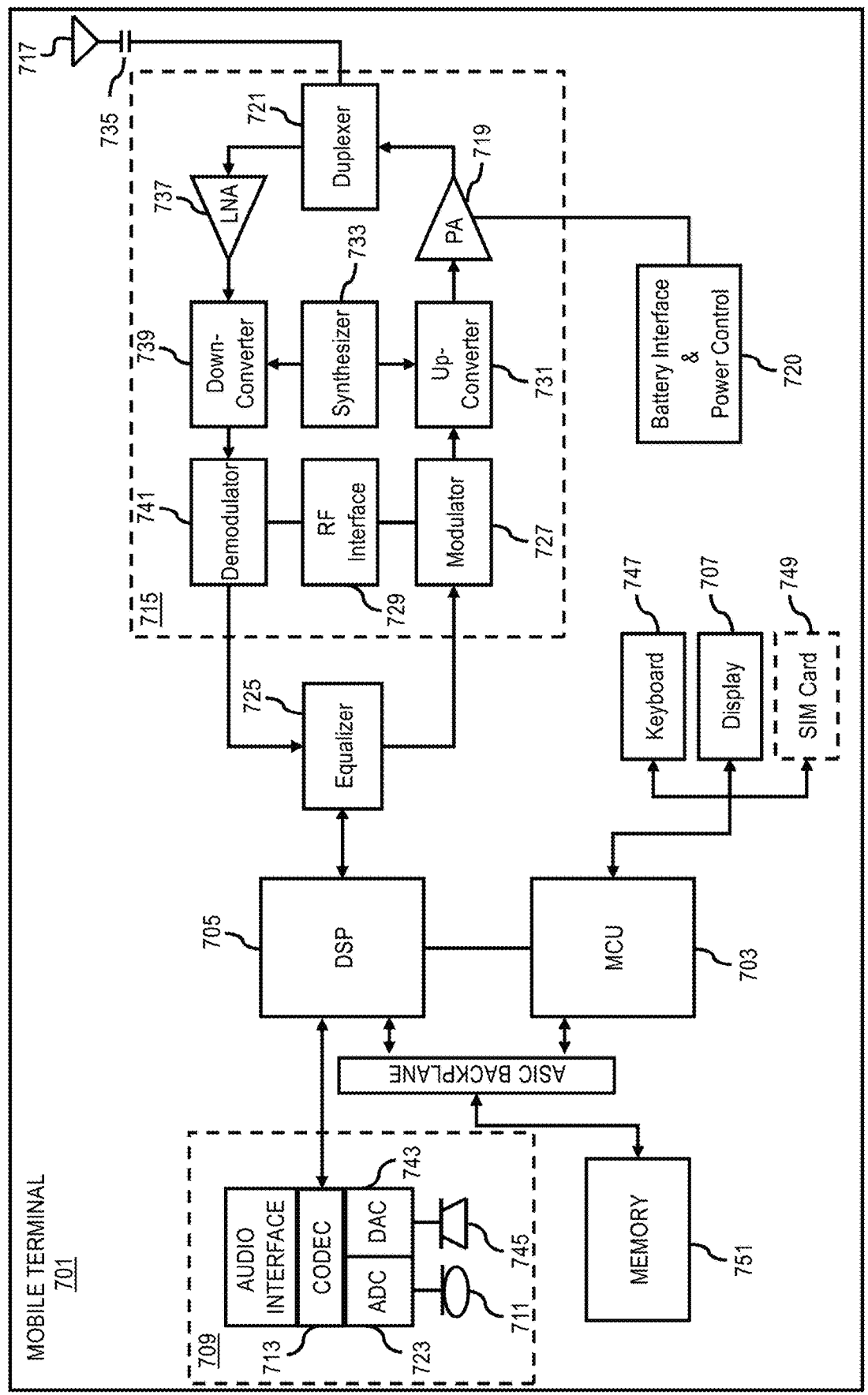
FIG. 7 is a diagram of a mobile terminal (e.g., handset) that can be used to implement an embodiment of the invention.

FIG. 7 is a diagram of exemplary components of a mobile terminal (e.g., handset) for communications, which is capable of operating in the system of FIG. 1, according to one embodiment. In some embodiments, mobile terminal 701, or a portion thereof, constitutes a means for performing one or more steps of initiating a computing task based on generation of a statement or question formed using context information related to a user. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of initiating a computing task based on generation of a statement or question formed using context information related to a user. The display 707 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703 which can be implemented as a Central Processing Unit (CPU).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to initiating a computing task based on generation of a statement or question formed using context information related to a user. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
  receiving, at a device, an input specifying a keyword;
  determining context information associated with the device, a user of the device, or a combination thereof, wherein the context information includes historical data indicating a information associated with the user;
  selecting a template for generating a question or a statement based on the keyword and the context information;
  generating the question or the statement by applying to the template the keyword and a plurality of terms determined based on the context information, wherein each of the terms is a word;
  presenting the question or the statement on a user interface of the device; and
  initiating a computing task based on the question or the statement.

2. The method of claim 1, further comprising:
  presenting the question or the statement with at least one of the terms as a user modifiable element on the user interface;
  adapting the at least one of the terms on the user interface based on a user interaction with the user modifiable element; and
  initiating another computing task based on the question or the statement as adapted,
  wherein the user modifiable element includes a recommendation menu of one or more alternative terms to replace the at least one of the terms.

3. The method of claim 2, further comprising:
  determining the user interaction with the recommendation menu to indicate a selection of one of the alternative terms; and
  presenting the selected alternative term in place of the at least one of the terms in the question or the statement on the user interface,
  wherein the recommendation menu includes a dropdown menu of the one or more alternative terms.

4. The method of claim 2, further comprising:
  performing a term lookup based on the at least one of the terms to provide the one or more alternative terms,
  wherein the template includes rules, criteria, conditions, or a combination thereof for constructing the question or the statement from the keyword and the context information.

5. The method of claim 1, wherein the terms are semantically different from the keyword.

6. The method of claim 1, wherein the initiating of the computing task comprises transmitting the question or the statement for posting to at least one social network of the user.

7. The method of claim 1, wherein the initiating of the computing task comprises performing a location-based query based on the question or the statement.

8. The method of claim 1, further comprising:
  categorizing the template according to one or more contextual parameters,
  wherein the one or more contextual parameters include a location parameter, a temporal parameter, or a combination thereof associated with the device, the user of the device, or a combination thereof,
  wherein the terms are determined based on the location parameter, the temporal parameter, or a combination thereof and independently from the keyword, and
  wherein the selecting of the template is further based on the categorizing.

9. The method of claim 1, further comprising:
  monitoring feedback information associated with the computing task; and
  updating the template or the selecting of the template for a subsequent request based on the feedback information.

10. An apparatus comprising:
  at least one processor; and
  at least one memory including computer program code for one or more programs,
  the at least one memory and the computer program code configured to, with the at least one processor, cause the apparatus to perform at least the following,
  receive, at a device, an input specifying a keyword;

determine context information associated with the device, a user of the device, or a combination thereof, wherein the context information includes historical data indicating a correlation between a plurality of previous questions or statements and historical context information associated with the user;

select a template for generating a question or a statement based on the keyword and the context information;

generate the question or the statement by applying to the template the keyword and a plurality of terms determined based on the context information, wherein each of the terms is a word;

present the question or the statement on a user interface of the device; and initiate a computing task based on the question or the statement.

11. The apparatus of claim 10, wherein the apparatus is further caused to:

present the plurality of terms as a plurality of user modifiable elements on the user interface, determine a user interaction with the user interface to indicate a selection of one of the plurality of user modifiable elements;

present an alternative term to replace one of the plurality of terms corresponding to the selected one of the plurality of user modifiable elements in the question or the statement; and initiate another computing task based on the question or the statement with the alternative term.

12. The apparatus of claim 10, wherein a rule is included in the template for constructing the question or statement from the keyword and the context.

13. The apparatus of claim 10, wherein the context information includes historical data indicating a correlation between a plurality of previous questions or statements and historical context information associated with the user.

14. The apparatus of claim 10, wherein the initiating of the computing task comprises transmitting the question or the statement for posting to at least one social network of the user.

15. The apparatus of claim 10, wherein the initiating of the computing task comprises performing a location-based query based on the question or the statement.

16. A non-transitory computer-readable storage medium carrying one or more sequences of one or more instructions which, when executed by one or more processors, cause an apparatus to perform;

receiving, at a device, an input specifying a keyword;

determining context information associated with the device, a user of the device, or a combination thereof, wherein the context information includes historical data indicating a correlation between a plurality of previous questions or statements and historical context information associated with the user;

selecting a template for generating a question or a statement based on the keyword and the context information;

generating the question or the statement by applying to the template the keyword and a plurality of terms determined based on the context information, wherein each of the terms is a word;

presenting the question or the statement on a user interface of the device; and initiating a computing task based on the question or the statement.

17. The non-transitory computer-readable storage medium of claim 16, wherein the apparatus is caused to further perform:

presenting the plurality of terms as a plurality of user modifiable elements on the user interface, determining a user interaction with the user interface to indicate a selection of one of the plurality of user modifiable elements;

presenting an alternative term to replace one of the plurality of terms corresponding to the selected one of the plurality of user modifiable elements in the question or the statement; and initiating another computing task based on the question or the statement with the alternative term.

18. The non-transitory computer-readable storage medium of claim 16, wherein a criteria is included in the template for constructing the question or the statement from the keyword and the context information.

19. The non-transitory computer-readable storage medium of claim 16, wherein the context information includes historical data indicating a correlation between a plurality of previous questions or statements and historical context information associated with the user.

20. The non-transitory computer-readable storage medium of claim 16, wherein the initiating of the computing task comprises performing a location-based query based on the question or the statement.

* * * * *